United States Patent

Comte

[11] Patent Number: 6,121,176
[45] Date of Patent: Sep. 19, 2000

[54] GLASSES WITH VERY HIGH REFRACTIVE INDEX

[75] Inventor: Marie Jacqueline Monique Comte, Fontenay Aux Roses, France

[73] Assignee: Corning S.A., Avon Cedex, France

[21] Appl. No.: 09/341,837

[22] PCT Filed: Jan. 27, 1998

[86] PCT No.: PCT/US98/01589

§ 371 Date: Jul. 9, 1999

§ 102(e) Date: Jul. 9, 1999

[87] PCT Pub. No.: WO98/32706

PCT Pub. Date: Jul. 30, 1998

[30] Foreign Application Priority Data

Jan. 29, 1997 [FR] France ................................ 97 00950

[51] Int. Cl.$^7$ ............................ C03C 3/068; C03C 3/066
[52] U.S. Cl. ............................... 501/78; 501/79; 501/90; 351/159
[58] Field of Search ................ 501/78, 79, 901; 351/159

[56] References Cited

U.S. PATENT DOCUMENTS

| | | | |
|---|---|---|---|
| 4,612,295 | 9/1986 | Sagara | 501/51 |
| 4,732,876 | 3/1988 | Nagamine et al. | 501/78 |
| 5,288,669 | 2/1994 | Grateau et al. | 501/78 |

FOREIGN PATENT DOCUMENTS

| | | |
|---|---|---|
| 0 570 687 | 4/1993 | European Pat. Off. . |
| 3201 344 A1 | 1/1982 | Germany . |
| 3201 346 A1 | 1/1982 | Germany . |
| 60-221338 | 6/1985 | Japan . |
| 850009654 | 7/1986 | Japan . |

*Primary Examiner*—Karl Group
*Attorney, Agent, or Firm*—Milton M. Peterson

[57] ABSTRACT

The invention concerns glasses that have a refractive index of more than 1.880, an Abbe number of more than or equal to 30.4, and a density of more than 4.1, and having the following chemical composition, expressed in wt. %, based on the oxides: $SiO_2$: 6–9, $B_2O_3$: 15–19, with $SiO_2+B_2O_3<26$, $Nb_2O_5$: 12 to <20.5, $ZrO_2$: 8–10, $TiO_2$: 7–11, $La_2O_3$: 23–32, with $ZrO_2+TiO_2+La_2O_3$: $\geq 44$, CaO: 8 to <13, SrO: 0–2, BaO: 0–2, MgO: 0–2, ZnO: 0–5, with $CaO+SrO+BaO+MgO+ZnO$: $\geq 9$, $Y_2O_3$: 0–5, $WO_3$: 0–5, $Li_2O+Na_2O+K_2O$: 0–2, others 0–1.

6 Claims, No Drawings

GLASSES WITH VERY HIGH REFRACTIVE INDEX

FIELD OF THE INVENTION

BACKGROUND OF THE INVENTION

The present invention relates to glasses having a refractive index of more than 1.880, an Abbe number of more than or equal to 30.4, and a density of less than 4.1.

Such glasses are of great interest for ophthalmic applications, particularly in the case of large corrective-vision levels: the high refractive index allows limiting the thickness of the glasses. The moderate density and the relatively high Abbe number also contribute to the comfort of the wearer.

Moreover, it is advantageous to have glasses that are easy to manufacture and that have a low manufacturing cost. For that purpose, a low cost of raw materials and a low tendency toward devitrification are desired elements.

PRIOR ART

Glasses presenting optical properties and a similar density to those described above are already known, but they are not satisfactory insofar as the cost of manufacture and the resistance to devitrification is concerned.

Thus, European Patent No. B-570,687 describes glasses having the following composition, expressed in wt % based on the oxides:

| | |
|---|---|
| $SiO_2$ | 5–8 |
| $B_2O_3$ | 15–21 |
| $ZrO_2$ | 3–10 |
| $TiO_2$ | 7–17 |
| $Nb_2O_5$ | 20.5–26 |
| with $ZrO_2 + Nb_2O_5$ | 29–45 |
| $La_2O_3$ | 19–32 |
| $Y_2O_3$ | 0–9 |
| CaO | 8–16 |
| SrO | 0–5 |
| BaO | 0–5 |
| MgO | 0–5 |
| with CaO + SrO + BaO + MgO | 8–16 |
| ZnO | 0–5 |
| $Li_2O$ | 0–2 |
| $K_2O$ | 0–2 |
| with $Li_2O + Na_2O + K_2O$ | 0–2 |

These glasses have a refractive index of more than 1.88, an Abbe number of more than 29, a density of less than 4.1, and an integrated transmission from 380 to 800 nm of more than 79% (under a thickness of 10 mm).

However, they present two disadvantages:

A very high tendency toward devitrification associated with a very low liquidus viscosity. The liquidus temperature is on the order of 1150° C.; at this temperature, the viscosity is only a few poise.

A high content of $Nb_2O_5$ (20.5–26), which makes the cost of the raw materials very high.

Other glasses whose composition presents a certain analogy with that of the glasses of the invention are known.

Thus Japanese Patent No. A-3-5340 (1991) describes glasses having a refractive index of 1.83–1.88, whose proportion is, in wt %:

| | |
|---|---|
| $SiO_2$ | 2–14 |
| $B_2O_3$ | 8–25 |
| with $SiO_2 + B_2O_3$ | 22–29 |
| CaO | 13–25 |
| MgO | 0–10 |
| with CaO + MgO | 13–25 |
| $La_2O_3$ | 15–28 |
| BaO + SrO + ZnO | 0–12 |
| with $La_2O_3$ + BaO + SrO + ZnO | 15–28 |
| $ZrO_2$ | 1–9 |
| $TiO_2$ | 6–15 |
| $Nb_2O_5$ | 6–20 |
| with $ZrO_2 + TiO_2 + Nb_2O_5$ | 24–38 |
| $K_2O + Na_2O + Li_2O$ | 0–3 |

Although this document mentions glasses that can have a refractive index of at most 1.88, the highest refractive index of the glasses described in the example reaches only 1.8725, with most of the glasses specifically described having much lower indices. Moreover, the CaO content of these prior glasses is much higher than that of the glasses of the invention.

German Patent No. C-4,242,859 claims glasses with a high refractive index whose composition, defined very broadly, is close to the composition of the glasses of the invention, from which it differs notably by a lower $ZrO_2$ (<8%) content and by the obligatory presence of fluorine. The five specific examples described differ from the glasses of the invention in other compositional differences affecting one or more constituents.

SUMMARY OF THE INVENTION

The invention concerns glasses having a refractive index of more than 1.880, an Abbe number of more than or equal to 30.4 and a density of less than 4.1, having the following chemical composition expressed in wt % based on the oxides:

| | |
|---|---|
| $SiO_2$ | 6–9 |
| $B_2O_3$ | 15–19 |
| with $SiO_2 + B_2O_3$ | <26 |
| $Nb_2O_5$ | 12 to <20.5 |
| $ZrO_2$ | 8–10 |
| $TiO_2$ | 7–11 |
| $La_2O_3$ | 23–32 |
| with $ZrO_2 + TiO_2 + La_2O_3$ | ≧44 |
| $Y_2O_3$ | 0–5 |
| $WO_3$ | 0–5 |
| CaO | 8–<13 |
| SrO | 0–2 |
| BaO | 0–2 |
| MgO | 0–2 |
| ZnO | 0–5 |
| with CaO + SrO + BaO + MgO + ZnO | ≧9 |
| $Li_2O + Na_2O + K_2O$ | 0–2 |
| Others | 0–1 |

Preferred glasses are those having the following chemical composition expressed in wt % based on the oxides:

| | |
|---|---|
| $SiO_2$ | 6.5–8 |
| $B_2O_3$ | 15.5–19 |
| with $SiO_2 + B_2O_3$ | <26 |
| $Nb_2O_5$ | 15–18.5 |
| $ZrO_2$ | ≧8 to 9 |

-continued

| | |
|---|---|
| $TiO_2$ | 9–11 |
| $La_2O_3$ | 25–30 |
| with $ZrO_2 + TiO_2 + La_2O_3$ | $\geq 44$ |
| CaO | 11 to $\geq 13$ |
| ZnO | 0–5 |
| with CaO + ZnO | $\geq 12$ |
| Others | 0–1 |

Even more preferred glasses are those having the following chemical composition expressed in wt % based on the oxides:

| | |
|---|---|
| $SiO_2$ | 6.5–8 |
| $B_2O_3$ | 15.5–19 |
| with $SiO_2 + B_2O_3$ | <26 |
| $Nb_2O_5$ | 15–18.5 |
| $ZrO_2$ | $\geq 8$ to 9 |
| $TiO_2$ | 0–10.5 |
| $La_2O_3$ | 25 to <28 |
| with $ZrO_2 + TiO_2 + La_2O_3$ | $\geq 44$ |
| CaO | 12–<13 |
| Others | 0–1 |

DESCRIPTION OF THE INVENTION

The reduced content of $Nb_2O_5$ of these glasses, compared to that of those described in European Patent No. B-570,687, allows a significant reduction in the cost of the raw materials.

The glasses of the invention also have an Abbe number at a much higher level than those of European Patent No. B-570,687. In fact, Abbe numbers in the 30.4–31.3 range have been obtained, whereas those for the glasses of the examples of European Patent No. B-570,687 are of 29.6–30.6. The decrease in the tendency toward devitrification observed for the glasses of the invention is connected with the fact that the principal crystalline phase that undergoes devitrification in the glasses from European Patent No. B-570,687 is a complex oxide with a high niobium content. The decrease in the content of this element allows the decrease in the tendency toward devitrification, with the number of crystals and the rate of their growth being significantly reduced. The most preferred compositions also present a lower liquidus temperature.

A refractive index of more than 1.88 cannot be obtained if the content of $Nb_2O_5$ is less than 12%.

For the same reason, the contents of $ZrO_2$, $TiO_2$, and $La_2O_3$ must be at least 8, 7, and 23%, respectively, and the total of the contents of these three elements must be at least 44%.

A $ZrO_2$ content of more than 10% leads to excessive devitrification.

A $La_2O_3$ content of more than 32% leads to an excessively high density.

The color of the glass is very sensitive to the $TiO_2$ content; for this reason, this element is limited to 11%.

Although they are less effective than the above-described elements, the oxides of alkaline earth metals and ZnO contribute to the obtention of a high index. They present the advantage of having a small influence on the dispersion. The oxides of alkaline earth metals limit the risk of devitrification of zirconium-rich phases. CaO is preferred among these oxides because it increases the density less than BaO or ZnO. It has also been observed that it was more interesting than MgO in regard to the devitrification. Its level must be between 8 and 13%.

$SiO_2$ and $B_2O_3$ are necessary as glass formation agents. Lower levels than 6 and 15%, respectively, lead to an unacceptable devitrification, whereas a total content of these oxides of more than 26% does not allow the obtention of the desired index.

It is possible to add small quantities of oxides of alkali metals, for example, to facilitate the melting. However, their total content must be limited to 2%, because these elements decrease the viscosity of the glass and, in particular, the liquidus viscosity. Preferably, they are absent from the composition.

It is also possible to add the usual refiners, such as $As_2O_3$, $Sb_2O_5$, fluorides, bromides, or chlorides, provided that their total content does not exceed 1%.

If fairly pure raw materials are used, for example, those contributing an $Fe_2O_3$ content of less than 10 ppm, the glass is only weakly colored. If desired, discoloration agents can be added. It is also possible to color the glass by adding the usual dyeing elements, for example, oxides of transition metals or rare earth metals.

The glasses described in the preferred domains ranges are optimized in terms of devitrification and density.

The invention is illustrated by the nonlimiting examples given in Table I.

All the proportions are expressed in wt %. Although these examples are only laboratory experiments, the glasses of the invention can be manufactured industrially using the classic methods of melting and forming.

In each case, 3000 g of raw materials are melted over 1 h at 1300° C. in a platinum crucible. The glass is then formed in the form of bars having a thickness of 1 cm. The annealing is carried out at 60° C./h.

The color of the glass was determined by measuring the integrated transmission, between 380 and 800 nm, of polished samples having a thickness of 10 mm.

The tendency toward devitrification was evaluated using the following test: for each composition, small pieces of glass placed in platinum crucibles were retreated for 5 min at 1096, 1112, and 1125° C., respectively. The crystallization levels observed visually were compared and a ranking between 1 and 4 was attributed to each glass: 4 for the glasses having the highest tendency to devitrification, and 1 for the glasses possessing the lowest tendency toward devitrification.

Example 1 belongs to the most preferred domain. Examples 2, 3 and 4 belong to the preferred domain. Example 8 is not within the scope of the invention: its $Nb_2O_5$ content is too high and it has an unacceptable tendency toward devitrification.

TABLE I

|  | 1 | 2 | 3 | 4 | 5 | 6 | 7 | 8 |
|---|---|---|---|---|---|---|---|---|
| $SiO_2$ | 7.3 | 7.3 | 7.3 | 7.3 | 7.3 | 7.3 | 7.3 | +7.3 |
| $B_2O_3$ | 16.85 | 16.65 | 16.65 | 17.15 | 16.65 | 17.65 | 18.15 | 16.65 |
| CaO | 12.5 | 12.5 | 12.5 | 12 | 12 | 10.5 | 9 | 14 |
| ZnO |  |  |  |  |  |  | 2.5 |  |
| $TiO_2$ | 9.6 | 10.1 | 9.6 | 9.6 | 8.6 | 9.6 | 9.6 | 8.6 |
| $ZrO_2$ | 8.2 | 8.2 | 8.5 | 8.7 | 8.2 | 8.2 | 8.2 | 8.2 |
| $Nb_2O_5$ | 18 | 15.95 | 16.9 | 17.7 | 18.2 | 17.7 | 17.7 | 21.2 |
| $La_2O_5$ | 27.5 | 29.25 | 28.5 | 27.5 | 29 | 29 | 27.5 | 24 |
| $As_2O_3$ | 0.05 | 0.05 | 0.05 | 0.05 | 0.05 | 0.05 | 0.05 | 0.05 |
| $SiO_2 + B_2O_5$ | 24.15 | 23.95 | 23.95 | 24.45 | 23.95 | 24.95 | 25.45 | 23.95 |
| $TiO_2 + ZrO_2 + La_2O_3$ | 45.3 | 47.55 | 46.6 | 45.8 | 45.8 | 46.8 | 45.3 | 40.8 |
| CaO + ZnO | 12.5 | 12.5 | 12.5 | 12 | 12 | 10.5 | 11.5 | 14 |
| Refractive Index | 1.884 | 1.885 | 1.885 | 1.884 | 1.883 | 1.884 | 1.883 | 1.883 |
| Abbe No. | 30.8 | 31.3 | 31.3 | 31 | 31.3 | 30.8 | 30.5 | 30.4 |
| Density | 4.03 | 4.06 | 4.05 | 4.03 | 4.07 | 4.05 | 4.05 | 3.98 |
| Transmission | 80.8 | 80.8 | 81.1 | 81.4 | 81.1 | 80.5 | 81.4 | 80.6 |
| Tendency Toward Devitrification | 2 | 1 | 2 | 2 | 2 | 3 | 1 | 4 |
| Liquidus (°C.) | 1122–1140 | 1123–1139 | 1143–1162 | 1143–1162 | 1130–1139 | 1152–1161 | 1139–1164 | 1149–1161 |

What is claimed is:

1. Glasses possessing a refractive index of more than 1.880, an Abbe number of at least 30.4, and a density of more than 4.1, and consisting essentially of the following component oxides within the indicated ranges, expressed in wt. %:

| | |
|---|---|
| $SiO_2$ | 6–9 |
| $B_2O_3$ | 15–19 |
| with $SiO_2 + B_2O_3$ | <26 |
| $Nb_2O_5$ | 12 to <20.5 |
| $ZrO_2$ | 8–10 |
| $TiO_2$ | 7–11 |
| $La_2O_3$ | 23–32 |
| with $ZrO_2 + TiO_2 + La_2O_3$ | ≧44 |
| $Y_2O_3$ | 0–5 |
| $WO_3$ | 0–5 |
| CaO | 8 to <13 |
| SrO | 0–2 |
| BaO | 0–2 |
| MgO | 0–2 |
| ZnO | 0–5 |
| with CaO + SrO + BaO + MgO + ZnO | ≧9 |
| $Li_2O + Na_2O + K_2O$ | 0–2 |
| Others | 0–1. |

2. Glasses according to claim 1, consisting essentially of the following component oxides within the indicated ranges expressed in wt %:

| | |
|---|---|
| $SiO_2$ | 6.5–8 |
| $B_2O_3$ | 15.5–19 |
| with $SiO_2 + B_2O_3$ | <26 |
| $Nb_2O_5$ | 15–18.5 |
| $ZrO_2$ | ≧8–9 |
| $TiO_2$ | 9–11 |
| $La_2O_3$ | 25–30 |
| with $ZrO_2 + TiO_2 + La_2O_3$ | ≧44 |
| CaO | 11 to <13 |
| ZnO | 0–5 |
| with CaO + ZnO | ≧12 |
| Others | 0–1 |

3. Glasses according to claim 2, consisting essentially of the following component oxides within the indicated ranges expressed in wt. %:

| | |
|---|---|
| $SiO_2$ | 6.5–8 |
| $B_2O_3$ | 15.5–19 |
| with $SiO_2 + B_2O_3$ | <26 |
| $Nb_2O_5$ | 15–18.5 |
| $ZrO_2$ | ≧8–9 |
| $TiO_2$ | 9–10.5 |
| $La_2O_3$ | 25–<28 |
| with $ZrO_2 + TiO_2 + La_2O_3$ | ≧44 |
| CaO | 12 to <13 |
| Others | 0–1 |

4. An ophthalmic lens composed of a glass having the properties and composition of claim 1.

5. An ophthalmic lens composed of a glass having the properties and composition of claim 2.

6. An ophthalmic lens composed of a glass having the properties and composition of claim 3.

* * * * *